United States Patent
Aggarwal et al.

(10) Patent No.: US 8,452,058 B2
(45) Date of Patent: May 28, 2013

(54) METHOD AND APPARATUS FOR REPEATABLE FACIAL DISTORTION

(75) Inventors: Gaurav Aggarwal, Greenbelt, MD (US); Rudolf Maarten Bolle, Bedford Hills, NY (US); Jonathan H. Connell, Cortlandt Manor, NY (US); Nalini Kanta Ratha, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 1049 days.

(21) Appl. No.: 12/041,879

(22) Filed: Mar. 4, 2008

(65) Prior Publication Data

US 2009/0226045 A1    Sep. 10, 2009

(51) Int. Cl.
*G06K 9/00* (2006.01)
(52) U.S. Cl.
USPC .......................................... 382/118; 382/115
(58) Field of Classification Search
USPC ................................. 382/115, 124
See application file for complete search history.

(56) References Cited

U.S. PATENT DOCUMENTS

| | | | | |
|---|---|---|---|---|
| 6,697,518 | B2 * | 2/2004 | Belhumeur et al. | 382/154 |
| 7,120,607 | B2 * | 10/2006 | Bolle et al. | 705/64 |
| 7,227,977 | B1 * | 6/2007 | Dotsenko | 382/118 |
| 2003/0179923 | A1 * | 9/2003 | Xiong et al. | 382/154 |
| 2005/0008199 | A1 * | 1/2005 | Dong et al. | 382/115 |
| 2006/0078171 | A1 * | 4/2006 | Govindaraju et al. | 382/115 |
| 2007/0065015 | A1 * | 3/2007 | Nishiyama et al. | 382/190 |
| 2007/0223830 | A1 * | 9/2007 | Ono | 382/254 |
| 2007/0297652 | A1 * | 12/2007 | Nishiyama et al. | 382/118 |
| 2008/0279423 | A1 * | 11/2008 | Zhang et al. | 382/118 |

OTHER PUBLICATIONS

Samaras et al, "Variable albedo surface reconstruction from stereo and shape from shading", Jun. 2000, IEEE, vol. 1, 480-487.*

* cited by examiner

*Primary Examiner* — Edward Park
(74) *Attorney, Agent, or Firm* — Preston J. Young, Esq.

(57) ABSTRACT

In one embodiment, the invention is a method and apparatus for repeatable facial distortion. One embodiment of a method for generating a secure facial image from an original facial image includes receiving the original facial image and a key, the key being associated with a subject depicted in the original facial image, and distorting the original facial image, in accordance with the key, to produce the secure facial image, where the distorting includes transforming at least one of: the albedo of the original facial image or the shape of the original facial image.

20 Claims, 6 Drawing Sheets

METHOD AND APPARATUS FOR REPEATABLE FACIAL DISTORTION

BACKGROUND OF THE INVENTION

The present invention relates generally to biometrics, and relates more particularly facial distortion techniques, for example as used in facial recognition applications.

Biometrics refers to the measurement of physical or behavioral traits of humans, often targeted towards the goal of verifying or determining personal identity. Biometric characteristics provide a more reliable alternative for establishing identity than personal identification numbers (PINs) or passwords, which can easily be stolen. However, biometric characteristics are not as secure or as private as PINs and passwords, because biometric signatures cannot be revoked or canceled if compromised. Thus, rogue establishments can use biometric signatures to track a subject (person) across databases and institutions without the knowledge or consent of the subject.

Efforts to combine biometric-based authentication with password-based privacy and security have been promising, but have not been without their drawbacks. For example, typical encryption-based biometric authentication techniques are sensitive to variability and noise in the input biometric space. Moreover, techniques that encrypt features extracted from input biometrics tend to be specific to the features used, and thus may not be able to easily exploit developing technology.

Thus, there is a need in the art for a method and apparatus for repeatable facial distortion that is secure and cancelable.

SUMMARY OF THE INVENTION

In one embodiment, the invention is a method and apparatus for repeatable facial distortion. One embodiment of a method for generating a secure facial image from an original facial image includes receiving the original facial image and a key, the key being associated with a subject depicted in the original facial image, and distorting the original facial image, in accordance with the key, to produce the secure facial image, where the distorting includes transforming at least one of: the albedo of the original facial image or the shape of the original facial image.

BRIEF DESCRIPTION OF THE DRAWINGS

So that the manner in which the above recited features of the present invention can be understood in detail, a more particular description of the invention may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In one embodiment, the invention is a method and apparatus for repeatable facial distortion that is secure and cancelable. Embodiments of the invention separate the reflectivity from the shading in an input facial image, distort the reflectivity and shading independently using a subject-specific key, and then combine the distorted reflectivity and distorted shading to generate a new (distorted) facial image. The new facial image is secure (i.e., difficult to compromise), private (i.e., sufficiently unrecognizable as the input facial image), and photometrically valid (i.e., can be matched using substantially any publicly available matching algorithm).

A given facial image is the result of interplay between the physical characteristics of the subject's three-dimensional face and the external imaging environment (influenced, for example, by the illumination, view, image-capturing device characteristics, etc.). Moreover, typical facial images fail to convey any real three-dimensional shape information for the face depicted, and shape is difficult to estimate based on a single image. Embodiments of the present invention account for these factors in generating a secure, photometrically valid facial image.

Figure 1:
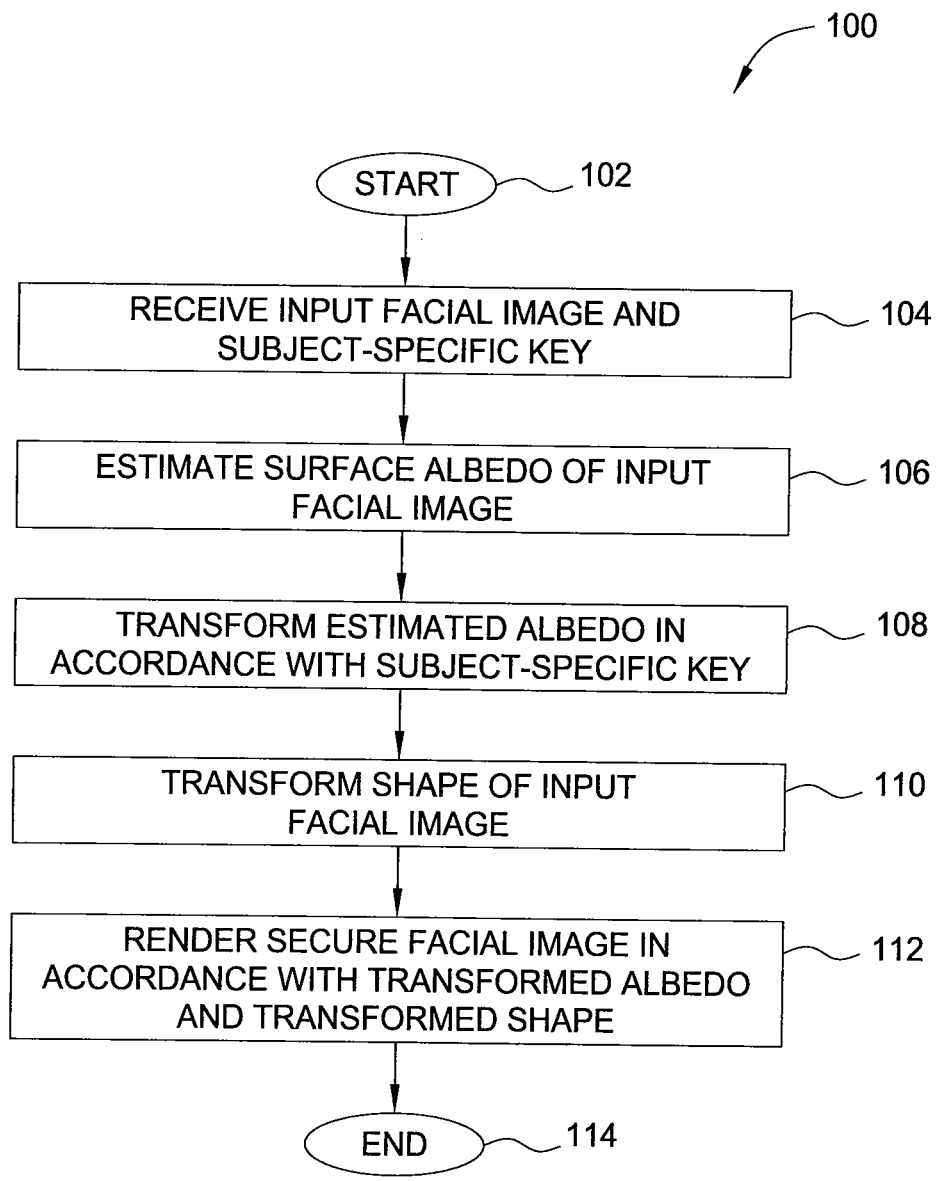
FIG. 1 is a flow diagram illustrating one embodiment of a method for constructing a secure facial image, according to the present invention.

FIG. 1 is a flow diagram illustrating one embodiment of a method 100 for constructing a secure (distorted) facial image, according to the present invention. The method 100 may be used, for example, to generate a secure, cancelable distorted version of an input facial image.

Figure 2:
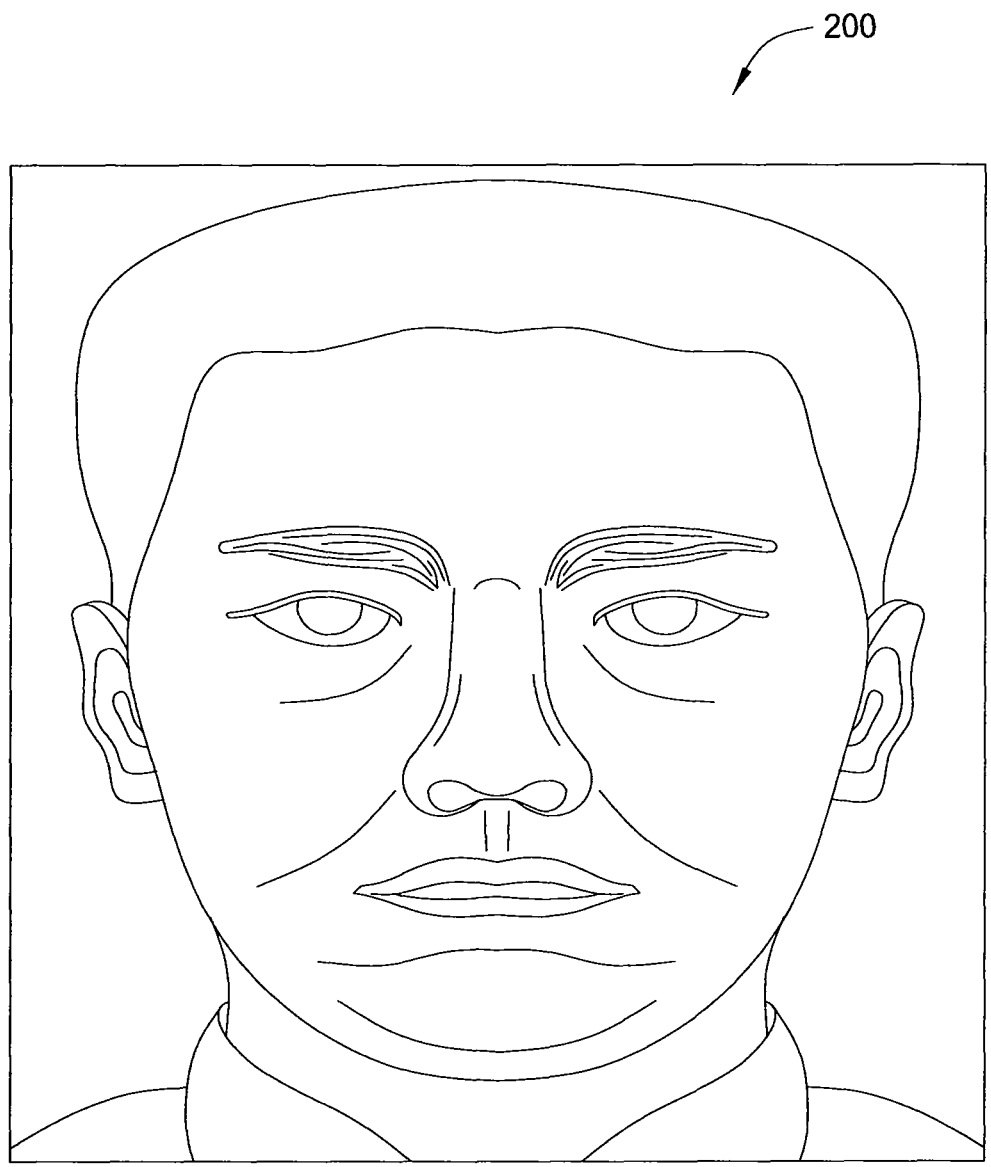
FIG. 2 illustrates an exemplary input facial image that may be manipulated according to embodiments of the present invention.

The method 100 is initialized at step 102 and proceeds to step 104, where the method 100 receives an input facial image and a subject-specific key corresponding to the subject of the input facial image. FIG. 2, for example, illustrates an exemplary input facial image 200 that may be manipulated according to embodiments of the present invention. In one embodiment, the subject-specific key is one of a plurality of available subject-specific keys, where each of the subject-specific keys may be used to generate a different distortion of the input facial image, as discussed in great detail below.

In step 106, the method 100 estimates the surface albedo (diffuse reflectivity) of the input facial image. In one embodiment, this step assumes that the input facial image is pre-cropped and pose-normalized to be in the frontal pose. In one embodiment, albedo estimation is performed using the non-stationary stochastic filtering framework proposed by Biswas et al. in "Robust Estimation of Albedo for Illumination-Invariant Matching and Shape Recovery", Proceedings of IEEE International Conference on Computer Vision, 2007, which is herein incorporated by reference in its entirety. Specifically, given a coarse albedo map (e.g., obtained using the average facial three-dimensional shape of humans), the method 100 estimates a more robust albedo map by compensating for the statistics of errors in surface normal estimation and light source estimation in an image restoration framework.

Figure 3:
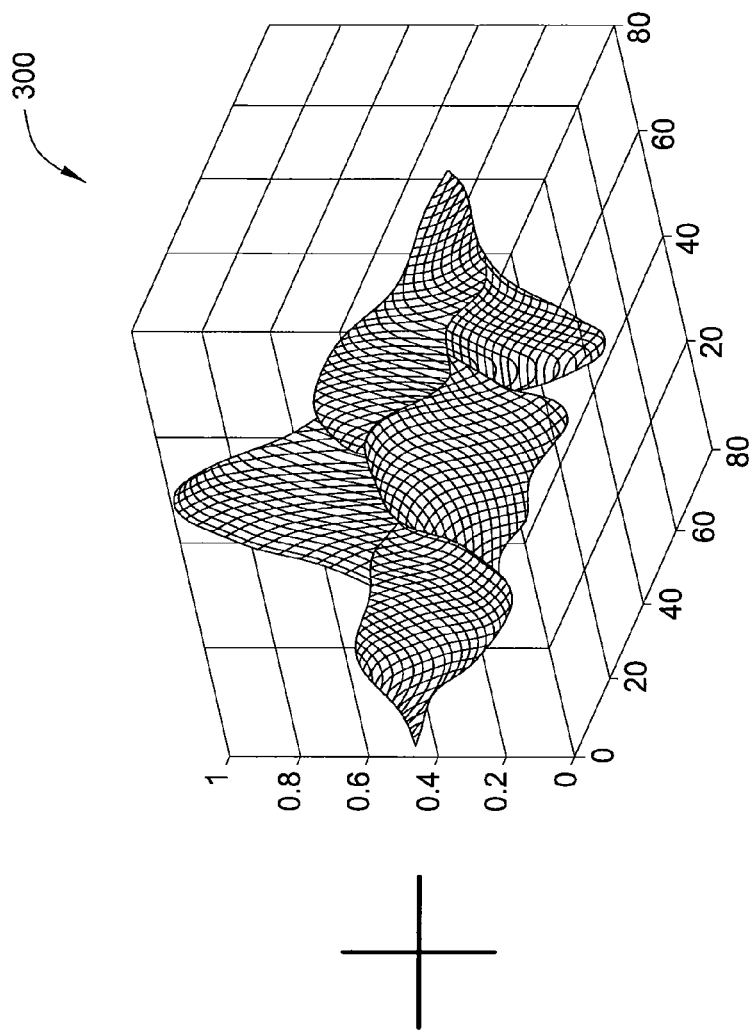
FIG. 3 illustrates an exemplary albedo transformation that may be derived from the exemplary input facial image, according to embodiments of the present invention.
Figure 3:
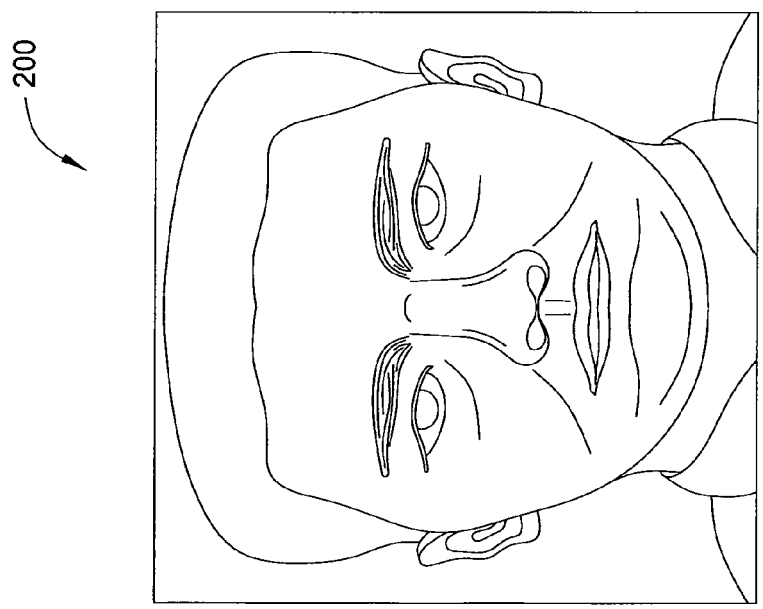

In step 108, the method 100 transforms the estimated albedo of the input facial image. FIG. 3, for example, illustrates an exemplary albedo transformation 300 that may be derived from the exemplary input facial image 200, according to embodiments of the present invention. In one embodiment, the transformation is achieved by multiplying the estimated albedo with a mixture of Gaussian images. In a further embodiment, the selection of transformation parameters, including the number, peak locations, and/or variance of the Gaussian distributions, is guided at least in part by using the subject-specific key received in step 104. Specifically, in one embodiment, these transformation parameters are encoded in the key.

Figure 4:
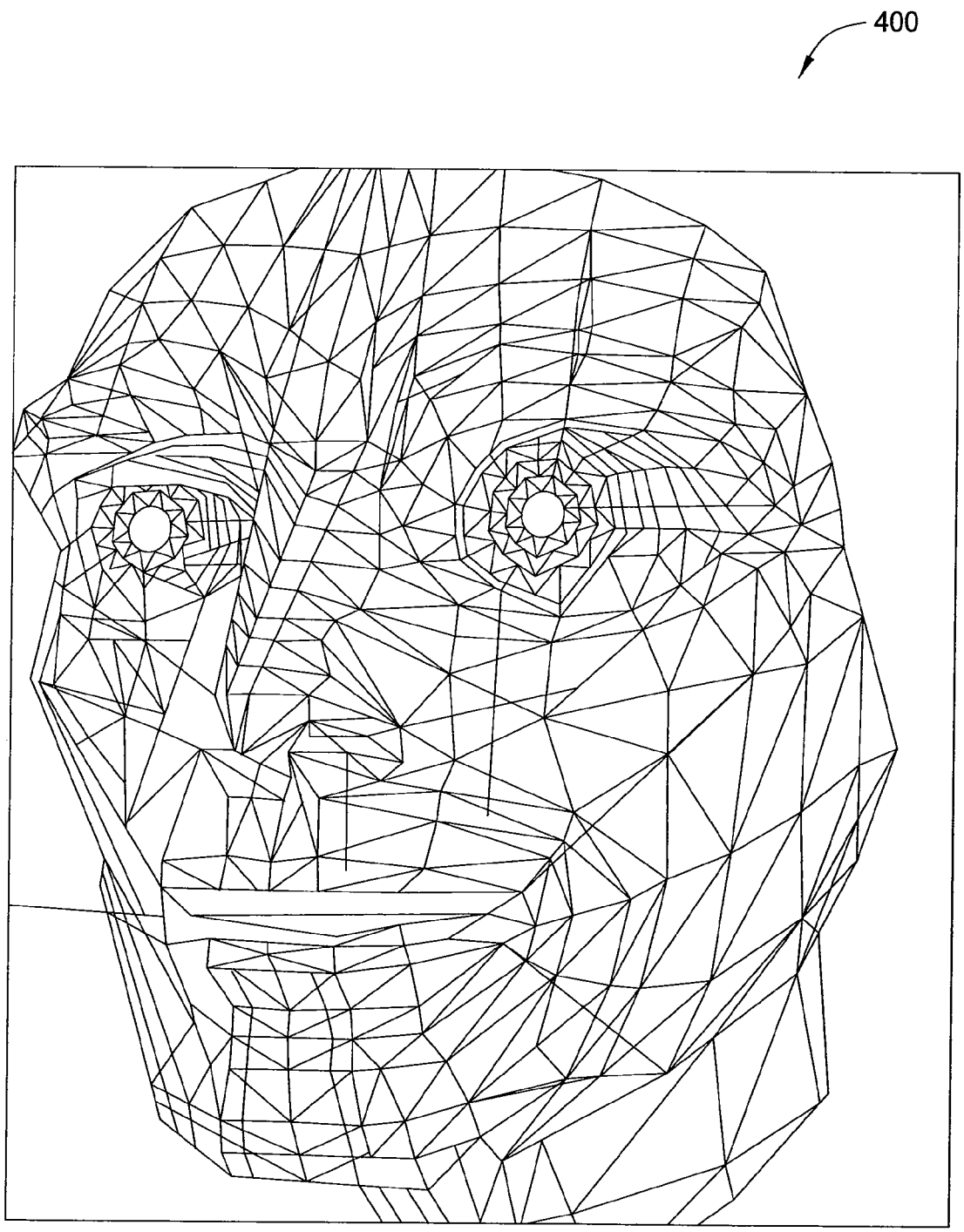
FIG. 4 illustrates an exemplary three-dimensional facial mesh that may be manipulated according to embodiments of the present invention.
Figure 5:
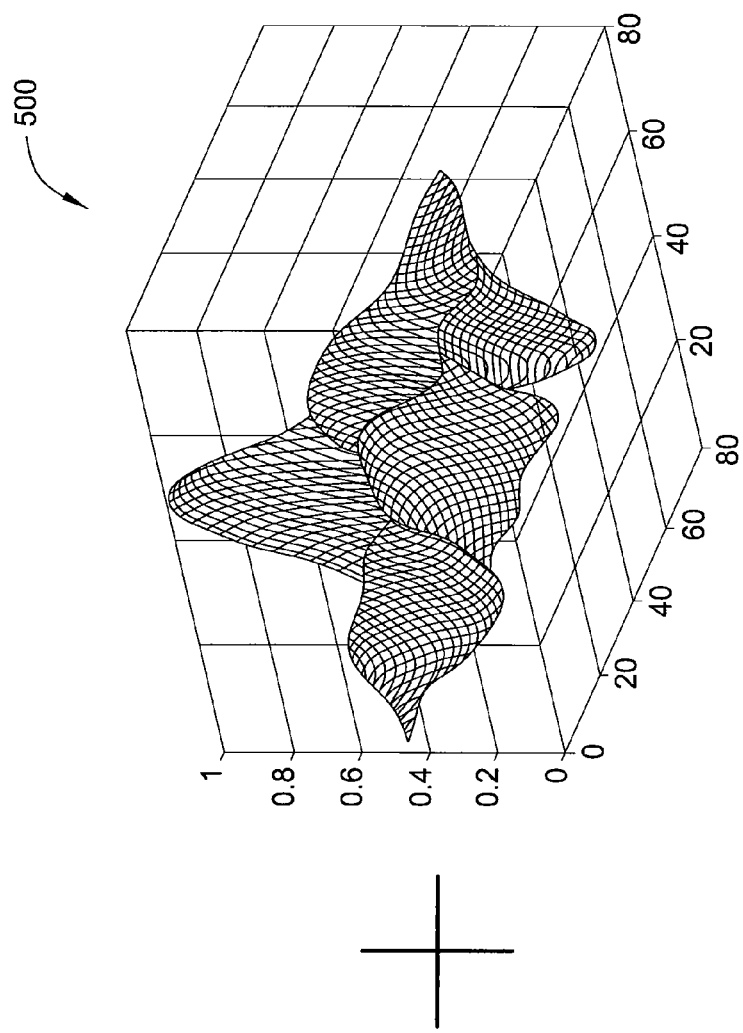
FIG. 5 illustrates an exemplary facial three-dimensional shape distortion that may be applied to the exemplary three-dimensional facial mesh, according to embodiments of the present invention.
Figure 5:
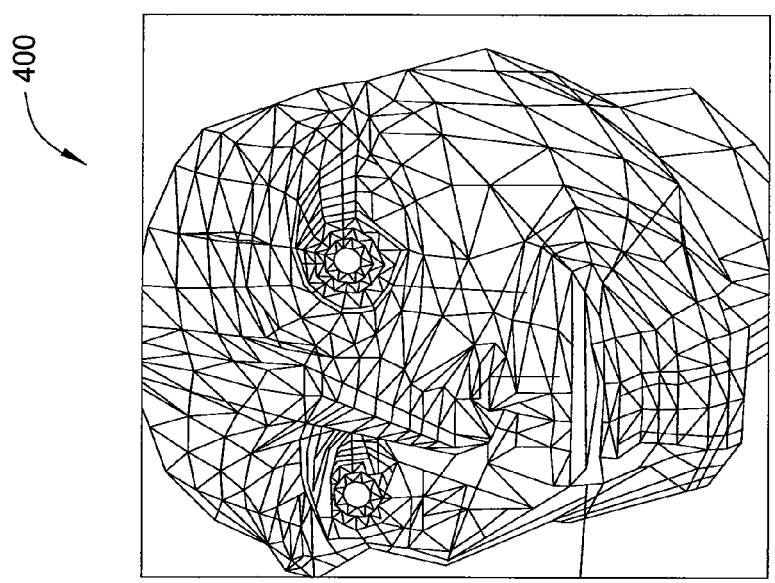

In step 110, the method 100 transforms the shape of the input facial image. Specifically, the method 100 aligns a three-dimensional facial mesh of the average three-dimensional facial shape with the shape of the input facial image. FIG. 4, for example, illustrates an exemplary three-dimensional facial mesh 400 that may be manipulated according to embodiments of the present invention. After aligning the three-dimensional facial mesh with the input facial image, the resultant aligned three-dimensional facial mesh is transformed (distorted) for secure face reconstruction. In one embodiment, the transformation is achieved by linearly combining the aligned three-dimensional facial mesh with a mixture of Gaussian surfaces. In a further embodiment, the selection of transformation parameters, including the mixture of Gaussian surfaces dictating the kind and amount of transformation applied to the aligned three-dimensional facial mesh, is guided at least in part by the subject-specific key received in step 104. Specifically, in one embodiment, these transformation parameters are encoded in the key. FIG. 5, for example, illustrates an exemplary facial three-dimensional shape distortion 500 that may be applied to the aligned three-dimensional facial mesh, according to embodiments of the present invention. The result is a transformed three-dimensional facial mesh aligned with the input facial image. In one embodiment, transformation of the shape of the input facial image further includes distorting the shading of the input facial image (e.g., based on the average facial three-dimensional shape and a random surface generated using the key).

In step 112, the method 100 renders a secure (transformed) facial image in accordance with the transformed albedo and the transformed three-dimensional facial mesh (i.e., as aligned with the input facial image). In one embodiment, the rendering is achieved in accordance with Lambertian reflectance and frontal illumination. Specifically, assuming a Lambertian reflectance model, a secure image can be easily rendered according to the following relation:

$$I_r = \rho_r(n_r \cdot s) \quad \text{(EQN. 1)}$$

where $I_r$ is the rendered secure image, $\rho_r$ is the transformed albedo map, $n_r$ is the transformed surface normal (shape) map, and s is the light source direction, which is assumed to be $[0, 0, 1]^T$ for frontal lighting. Thus, the method 100 computes an intensity map based on the transformed shape and the light source direction, and then multiplies this intensity map by transformed albedo map.

The method 100 outputs the secure facial image in step 114 before terminating in step 116.

Experimental results have shown that a secure facial image produced in accordance with the method 100 affords both privacy and cancelability. For instance, a comparison of genuine and impostor score distributions obtained while comparing secure facial images against input (original) facial images shows that the genuine and impostor score distributions had little to no separation. This indicates that the secure facial images reveal no significant identifying information when compared against original intensity input facial images. Moreover, a comparison of genuine score distributions obtained when performing a verification experiment using secure facial images against genuine score distributions obtained by comparing input (original) facial images against secure images of the same subjects shows that the genuine score distributions are non-overlapping. Additionally, the genuine score distributions obtained by comparing input (original) facial images against secure images of the same subjects has a lower score (low: privacy) than the genuine score distributions obtained when performing a verification experiment using secure facial images (high: performance). This indicates that an authentication system can easily set a threshold to separate a genuine query against an impostor query, even using the secure facial images, without sacrificing performance.

Figure 6:
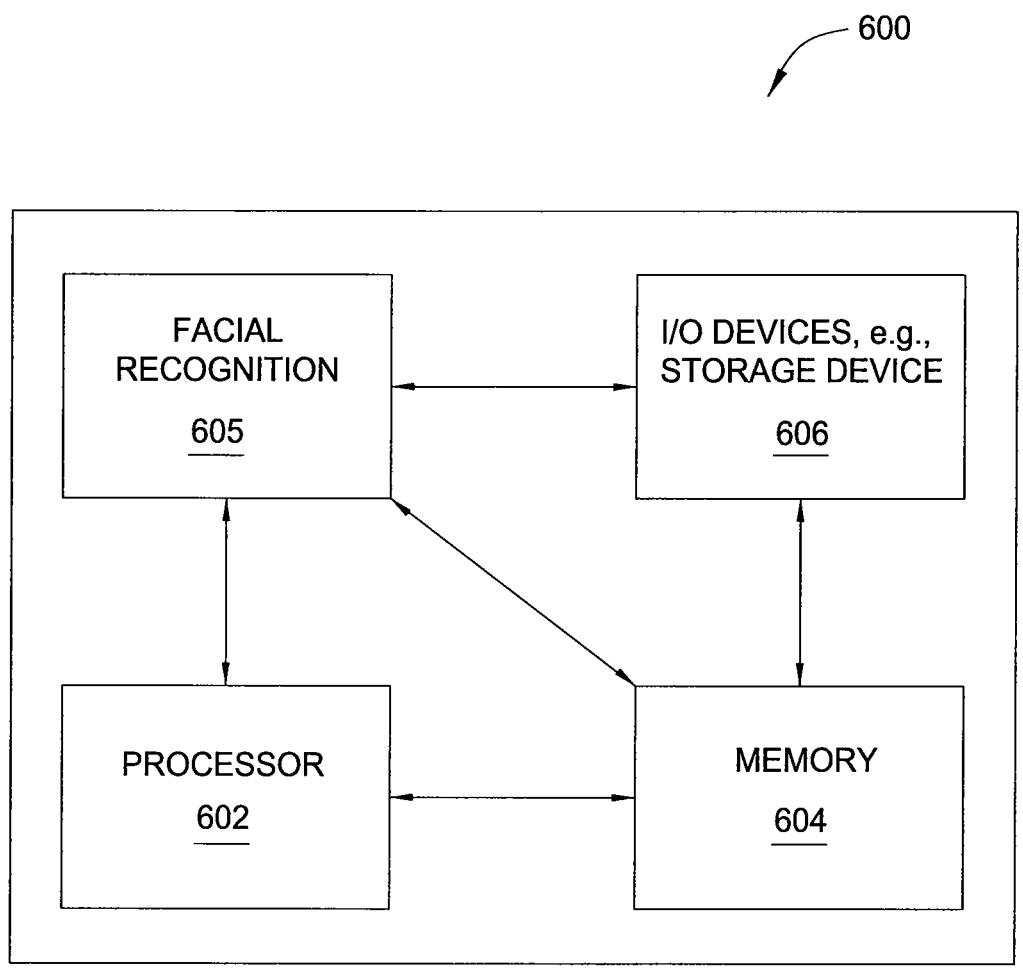
FIG. 6 is a high level block diagram of the present facial recognition method that is implemented using a general purpose computing device.

FIG. 6 is a high level block diagram of the present facial distortion method that is implemented using a general purpose computing device 600. In one embodiment, a general purpose computing device 600 comprises a processor 602, a memory 604, a facial distortion module 605 and various input/output (I/O) devices 606 such as a display, a keyboard, a mouse, a modem, a network connection and the like. In one embodiment, at least one I/O device is a storage device (e.g., a disk drive, an optical disk drive, a floppy disk drive). It should be understood that the facial distortion module 605 can be implemented as a physical device or subsystem that is coupled to a processor through a communication channel.

Alternatively, the facial distortion module 605 can be represented by one or more software applications (or even a combination of software and hardware, e.g., using Application Specific Integrated Circuits (ASIC)), where the software is loaded from a storage medium (e.g., I/O devices 606) and operated by the processor 602 in the memory 604 of the general purpose computing device 600. Additionally, the software may run in a distributed or partitioned fashion on two or more computing devices similar to the general purpose computing device 600. Thus, in one embodiment, the facial distortion module 605 for generating secure (distorted) facial images for facial recognition applications described herein with reference to the preceding figures can be stored on a computer readable medium or carrier (e.g., RAM, magnetic or optical drive or diskette, and the like).

It should be noted that although not explicitly specified, one or more steps of the methods described herein may include a storing, displaying and/or outputting step as required for a particular application. In other words, any data, records, fields, and/or intermediate results discussed in the methods can be stored, displayed, and/or outputted to another device as required for a particular application. Furthermore, steps or blocks in the accompanying Figures that recite a determining operation or involve a decision, do not necessarily require that both branches of the determining operation be practiced. In other words, one of the branches of the determining operation can be deemed as an optional step.

While the foregoing is directed to embodiments of the present invention, other and further embodiments of the invention may be devised without departing from the basic scope thereof. Various embodiments presented herein, or portions thereof, may be combined to create further embodiments. Furthermore, terms such as top, side, bottom, front, back, and the like are relative or positional terms and are used with respect to the exemplary embodiments illustrated in the figures, and as such these terms may be interchangeable.

What is claimed is:

1. A method for generating a secure facial image from an original facial image, comprising:

receiving the original facial image and a key, the key being associated with a subject depicted in the original facial image; and distorting the original facial image using a processor, in accordance with the key, to produce the secure facial image, wherein the distorting comprises:

separately distorting an original albedo of the original facial image and an original shape of the original facial image to produce a distorted albedo and a separate distorted shape, respectively, wherein the distorted albedo and the distorted shape are unrecognizable as the original albedo and the original shape; and combining the distorted albedo and the distorted shape to produce the secure facial image.

2. The method of claim 1, wherein the combining comprises:

computing an intensity map based on the distorted shape and a light source direction; and multiplying the intensity map by a map of the distorted albedo.

3. The method of claim 1, wherein distorting the original albedo comprises:

estimating the original albedo of the original facial image to produce an estimated albedo; and distorting the estimated albedo.

4. The method of claim 3, wherein distorting the estimated albedo comprises:

multiplying the estimated albedo with one or more Gaussian images.

5. The method of claim 4, wherein the key at least partially determines at least one of: a number of the one or more Gaussian images, a peak location of the one or more Gaussian images, or a variance of the one or more Gaussian images.

6. The method of claim 3, wherein the estimating comprises:

obtaining a coarse albedo map for the original facial image; and compensating for statistics of errors in surface normal estimation and light source estimation in the coarse albedo map.

7. The method of claim 6, further comprising:

assuming that the original facial image is pre-cropped and pose-normalised.

8. The method of claim 3, wherein the estimating is performed using a non-stationary stochastic filtering framework.

9. The method of claim 1, wherein distorting the original shape of the original facial image comprises:

adjusting a three-dimensional facial mesh of an average three-dimensional facial shape such that the three-dimensional facial mesh is aligned with the original facial image to produce an aligned three-dimensional facial mesh; and distorting the aligned three-dimensional facial mesh.

10. The method of claim 9, wherein distorting the aligned three-dimensional facial mesh comprises:

linearly combining the aligned three-dimensional facial mesh with one or more Gaussian surfaces.

11. The method of claim 9, wherein the key at least partially determines at least one of: a kind of distortion applied to the aligned three-dimensional facial mesh and an amount of distortion applied to the aligned three-dimensional facial mesh.

12. The method of claim 9, wherein the combining is achieved in accordance with Lambertian reflectance and frontal illumination.

13. The method of claim 1, wherein the key is one of a plurality of keys that may be used.

14. The method of claim 1, wherein distorting the shape further comprises:

distorting a shading of the original facial image.

15. The method of claim 1, wherein the secure facial image is unrecognizable as the original facial image.

16. A non-transitory computer readable storage device containing an executable program for generating a secure facial image from an original facial image, where the program performs the steps of:

receiving the original facial image and a key, the key being associated with a subject depicted in the original facial image; and distorting the original facial image, in accordance with the key, to produce the secure facial image, wherein the distorting comprises:

separately distorting an original albedo of the original facial image and an original shape of the original facial image to produce a distorted albedo and a separate distorted shape, respectively, wherein the distorted albedo and the distorted shape are unrecognizable as the original albedo and the original shape; and combining the distorted albedo and the distorted shape to produce the secure facial image.

17. The non-transitory computer readable storage device of claim 15, wherein distorting the original shape of the original facial image comprises:

adjusting a three-dimensional facial mesh of an average three-dimensional facial shape such that the three-dimensional facial mesh is aligned with the original facial image to produce an aligned three-dimensional facial mesh; and distorting the aligned three-dimensional facial mesh.

18. The non-transitory computer readable storage device of claim 16, wherein distorting the original albedo comprises:

estimating the original albedo of the original facial image to produce an estimated albedo; and distorting the estimated albedo.

19. The non-transitory computer readable storage device of claim 18, wherein distorting the estimated albedo comprises:

multiplying the estimated albedo with one or more Gaussian images.

20. Apparatus for generating a secure facial image from an original facial image, comprising:

means for receiving the original facial image and a key, the key being associated with a subject depicted in the original facial image; and means for distorting the original facial image, in accordance with the key, to produce the secure facial image, wherein the means for distorting comprises:

means for separately distorting an original albedo of the original facial image and an original shape of the original facial image to produce a distorted albedo and a separate distorted shape, respectively, wherein the distorted albedo and the distorted shape are unrecognizable as the original albedo and the original shape; and means for combining the distorted albedo and the distorted shape to produce the secure facial image.

* * * * *